Patented Mar. 7, 1933

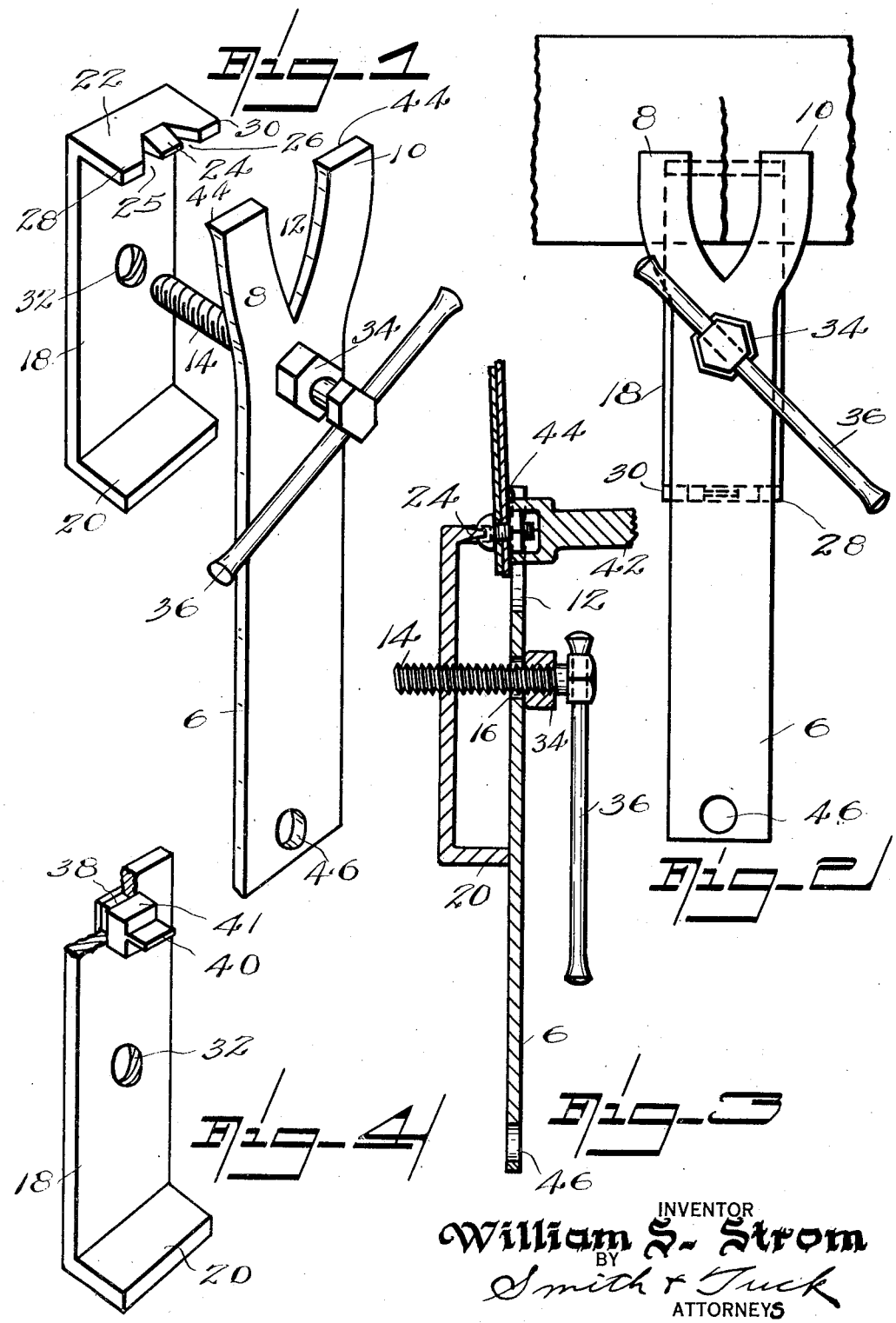

1,900,314

UNITED STATES PATENT OFFICE

WILLIAM S. STROM, OF SEATTLE, WASHINGTON

SHEET METAL CLAMP

Application filed September 22, 1931. Serial No. 564,410.

My present invention relates to the art of sheet metal repairing and more particularly to a sheet metal clamp.

In recent years torn and damaged parts of fenders and auto bodies in general, particularly have been repaired by means of welding, instead of the older method of putting a backing plate back of the tear and riveting the same. This has made it necessary to provide means which will hold the two torn edges firmly together in their normal position so that repairs can easily be made. In the past it has been necessary to use many make-shift devices for this purpose and in my present plan, it is believed I have produced a device which will be a great assistance to those making such repairs. I have further found it profitable to add a further very desirable feature to my device. This is in the form of a locking type of screw driver. In this way I have produced a device that has wide application to the sheet metal industry, aside from automotive work.

The principal object of my invention is to provide a tool which will securely hold into proper position and bring into proper position the two margins of a torn piece of metal, and still permit easy repair of the same.

A further object is to provide means for securely engaging and holding a screw having a screw-driver slot.

Other and more specific objects will be apparent from the following description taken in connection with the accompanying drawing, wherein;

Figure 1 is a perspective view showing my device.

Figure 2 is a front elevation of my device.

Figure 3 is a vertical sectional view through my device as it would be used in removing a rusted-on bolt, for instance, and it shows a socket wrench engaging the nut of the bolt.

Figure 4 is a perspective view partly broken away of a modified form of my screw driver end.

Referring to the drawing, throughout which like reference characters indicate like parts, 6 designates the body member of my device. This member is normally made of a flat steel bar. For general automobile fender repair work, I have found it convenient to use flat steel approximately three-sixteenths of an inch thick and an inch and one-half wide. This member is bifurcated at its upper end to provide the two leg portions 8 and 10, and the U-shaped opening 12. Disposed coaxially of the member and at a point immediately below the opening 12 I provide a clamp screw 14, this screw passes through the hole 16 in member 6 which is considerably larger than the screw so that there will be no binding action there.

Screw 14 is adapted to screw into the clamp bar 18. This member which will normally be of the same material as member 6 has each of its opposite ends turned inwardly, thus providing the two rest portions 20 and 22. One of these end portions as 22 is provided with a screw driver head arrangement 24, which is created by notching out on each side of the central portion as at 25 and 26, and then leaving the extreme edge portions at 28 and 30, which will be substantially of the same height as member 20. At the center of the clamp bar 18, I provide the screw engaging tap hole 32. It is desirable to have this hole at the center of bar 18 or approximately there, as it is desirable to reverse the ends at times.

If the device is used as shown in Figure 2, for instance, it is most desirable to have the straight end portion 20 uppermost, as in this way a more secure backing is provided for the two sheet metal sheets.

Screw 14 is normally made from a long bolt, or cap screw, however, the exact construction of this screw is relatively unimportant, providing it is equipped with a shoulder as indicated by the nut 34. This shoulder might easily be made solid with the screw. It is then desirable to have a short handle as 36, which preferably can slide within the head of bolt 14. This makes it possible to apply as much pressure as the screw will normally stand without the necessity of resorting to the use of a wrench and the like which are not very convenient for such an operation.

In Figure 4 I have illustrated a modified form of end 22, in which, instead of bending over the end to match end 20, I have provided an inset piece of material as 38. This should be secured within the end of member 18 by means of preferably a square or splined hole so as to prevent member 38 turning within the clamp bar 18. The endwardly extending end of member 18 is provided with the conventional screw engaging driver portion 40. The form as illustrated in Figure 4 does not provide the rest members 28 and 30. However, it does have one outstanding advantage in that the large bar 18 may be made of cheaper steel and the inserted piece 38 may be made of high grade tool steel. Thus reducing the total cost of the device.

It has been found desirable to form the insert member 38 with a squared or hexagon-shaped portion at 41. This provides a very satisfactory anchoring member for a nut engaging socket, such as used in automotive work. When a socket is so used, it is used after the fashion of Figure 3, and the clamp arrangement, of course, holds it very securely.

In Figure 3 I have illustrated one of the methods of using my device. This fits in reversing the clamp bar 18 from the position shown in Figure 2 until the screw driver end is uppermost. The driver portion 24 or in the form shown in Figure 4 member 40 is introduced into the slot of the screw. The opening 12 on member 6 is positioned to straddle the nut. Then screw 14 is tightened and the screw will be held very securely. A socket wrench as 42 may then be applied to the nut, and either the nut will loose on the bolt, or it will be possible to twist off the rather small bolts used for this purpose. Either result is equally satisfactory as it is not normally desirable to use the bolt over again.

Another feature of construction which has been found to add considerable to the utility of this tool is to form an inwardly extending edge on member 6 at the end of each tongue member 8 and 10 as indicated at 44. This has the effect of more securely holding two sheet metal parts in close alinement, but has a further advantage in that the device may be clamped, for instance, upon the bead of the fender or fender bracket, and by inserting a hook in the opening 46, at the opposite end of member 6, a tackle or jack may be employed to exert a considerable pull on a bent member and thus materially assist in straightening the same.

The foregoing description and the accompanying drawing are believed to clearly disclose a preferred embodiment of my invention but it will be understood that this disclosure is merely illustrative and that such changes in the invention as may be made are fairly within the scope and spirit of the following claims;

Having thus fully described my invention, what I claim as new and desire to secure by Letters Patent is:

1. In a clamp as described, the combination with a plate having flanged ends, one of said ends having a notch and a screw-driver head centered in the notch, of a second plate and a screw bar connecting said plates, said second plate having a bifurcated end complementary to the notched-flanged-end for the purpose described and either of said flange ends of the first named plate adapted to rest against the second plate and form a fulcrum for the screw bar to tighten against.

2. In a clamp as described, the combination with a plate having a flange at each end and a threaded opening at the approximate center of the plate, one of said flanges having a screw-driver head and recesses at the sides of said head forming spaced anvils on the flange, of a second plate having an opening and a screw bar in said opening engaging the threaded opening, said second plate having a recess for alinement with said screw-driver head and a pair of spaced tongues for alinement with the spaced anvils, for the purpose described and either of said flange ends of the first named plate adapted to rest against the second plate and form a fulcrum for the screw bar to tighten against.

3. In a clamp as described, the combination with a plate having ends formed as inwardly extending rest portions, one of said ends being formed as a screw driver head, the face of which is of substantially the same inward extent as the rest on the opposite end of the plate, of a second plate and a screw bar connecting said plates, said second plate having a recess for alignment with said screw driver head and a pair of spaced tongues having inwardly extending end edges, and either of said rest portions of the first named plate adapted to rest against the second plate and form a fulcrum for the screw bar to tighten against.

In witness whereof, he hereunto subscribes his name this 12th day of September A. D. 1931.

WILLIAM S. STROM.